United States Patent
King

(10) Patent No.: US 8,835,737 B2
(45) Date of Patent: Sep. 16, 2014

(54) PIANO TABLATURE SYSTEM AND METHOD

(71) Applicant: Kevin King, Santa Barbara, CA (US)

(72) Inventor: Kevin King, Santa Barbara, CA (US)

( * ) Notice: Subject to any disclaimer, the term of this patent is extended or adjusted under 35 U.S.C. 154(b) by 0 days.

(21) Appl. No.: 13/900,369

(22) Filed: May 22, 2013

(65) Prior Publication Data

US 2013/0319207 A1    Dec. 5, 2013

Related U.S. Application Data

(60) Provisional application No. 61/654,573, filed on Jun. 1, 2012.

(51) Int. Cl.
   *G09B 15/02*     (2006.01)
(52) U.S. Cl.
   CPC .................................. *G09B 15/023* (2013.01)
   USPC ....................................... 84/483.2; 84/471 R
(58) Field of Classification Search
   USPC ................................................. 84/483.2, 471
   See application file for complete search history.

(56) References Cited

U.S. PATENT DOCUMENTS

| | | | | | |
|---|---|---|---|---|---|
| 1,473,495 | A | * | 11/1923 | Miller | 84/483.2 |
| 1,768,706 | A | * | 7/1930 | Miller | 84/471 R |
| 2,271,772 | A | * | 2/1942 | Maffei | 84/483.1 |
| 6,388,181 | B2 | * | 5/2002 | Moe | 84/477 R |
| 6,476,303 | B1 | * | 11/2002 | Mutou et al. | 84/483.2 |
| 6,987,220 | B2 | * | 1/2006 | Holcombe | 84/483.2 |
| 7,005,569 | B2 | | 2/2006 | Feidner | |
| 7,439,438 | B2 | * | 10/2008 | Hao | 84/483.2 |
| 7,674,965 | B2 | * | 3/2010 | Mataele | 84/483.2 |
| 7,767,895 | B2 | * | 8/2010 | Johnston | 84/483.2 |
| 7,982,115 | B2 | * | 7/2011 | Johnston | 84/483.2 |
| 8,319,085 | B2 | * | 11/2012 | Iglesias Alvaro-Gracia | 84/477 R |
| 2005/0016359 | A1 | | 1/2005 | Berens | |
| 2009/0064847 | A1 | * | 3/2009 | Hao | 84/483.2 |
| 2009/0266222 | A1 | | 10/2009 | Epstein | |
| 2012/0135789 | A1 | * | 5/2012 | Feidner | 463/7 |
| 2013/0319207 | A1 | * | 12/2013 | King | 84/471 R |
| 2014/0041512 | A1 | * | 2/2014 | Mastran et al. | 84/483.2 |

* cited by examiner

*Primary Examiner* — Robert W Horn
(74) *Attorney, Agent, or Firm* — George A. Leone; Citadel Patent Law

(57) ABSTRACT

A piano tablature includes tab keys indicating a new measure where the tab keys display a standard piano keyboard. Middle C on a piano keyboard is highlighted. A tab measure includes note indicators for a selected song. The first beat of a tab measure is indicated by the bottom horizontal line of the tab header and each horizontal line of the tab measure below the bottom horizontal line represents a new beat in the measure, the placement of the note indicator can be traced vertically to a tab header to a corresponding note. White keys are represented by placing a note indicator between 2 vertical lines in the tab measure and black keys are represented by placing a note indicator directly on a vertical line. A piano tab is read from top to bottom.

20 Claims, 5 Drawing Sheets

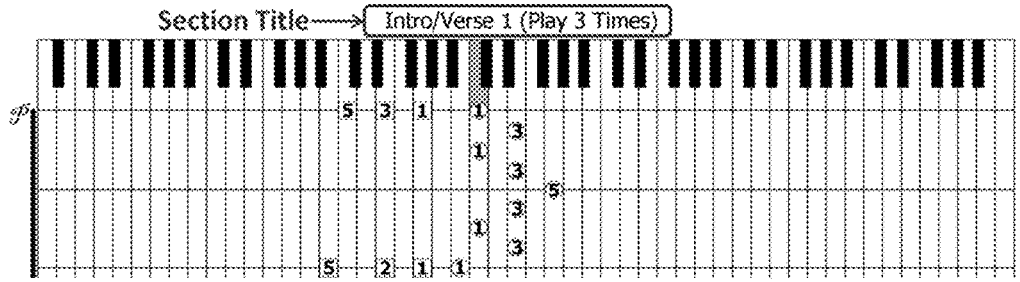
FIG. 8
```
Verse 1:    text for verse 1....
Chorus 1: text for chorus 1....
Verse 2: text for verse 2....
Chorus 2: text for chorus 2....
```
FIG. 9
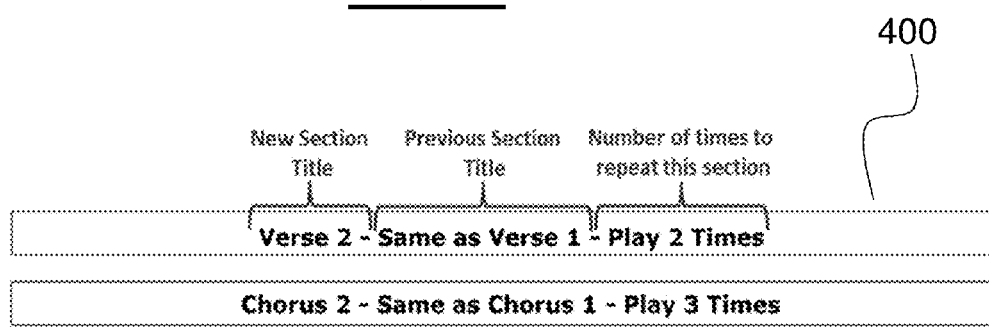
FIG. 10

PIANO TABLATURE SYSTEM AND METHOD

CROSS-REFERENCE TO RELATED APPLICATIONS

This application claims priority to, and incorporates by reference, U.S. Provisional Patent Application Ser. No. 61/654,573 which was filed on Jun. 1, 2012.

TECHNICAL FIELD

The present invention relates to a method and system for teaching piano using a piano tablature system that employs reading charts with notations that trace to keys on a piano.

BACKGROUND

Learning to read standard music notation can be difficult. Thus an easy to read system has long been sought to make reading piano music easier. Several attempts at improved teaching methods have been proposed, yet there remains a need for a method and system that better facilitates learning how to play a keyboard instrument.

For example, US Patent Application Publication No. US 2005/0016359 A1 to Berens, Pub. Date: Jan. 27, 2005, entitled "Teaching Method And Guides To Teach Piano," teaches a guide with vertical numerically color coded lines on it. The guide can then be moved along the space between the keys and the fallboard of the piano, so that the keys can be played by anyone placing their fingers on the keys indicated by the lines on the guide. Sheet music is prepared with numbers and colors juxtaposed to the notes corresponding to the lines, so that the piano student will know which keys to stroke.

In another example, U.S. Pat. No. 7,005,569 to Feidner, issued Feb. 28, 2006, entitled "Method for Imparting Music Score Reading and Keyboard Performance Skills," discloses a method which facilitates for players the learning of music reading in the playing of keyboard instruments, which comprises the steps of providing a plurality of musical staves, musical notes, and letters of the alphabet corresponding to the musical notes; and causing the player to play sequentially pairs of musical notes by striking corresponding keys on the keyboard.

In yet another example, U.S. Pat. No. 7,982,115 issued Jul. 19, 2011 to Johnston, entitled "Music Notation System," discloses a music notation system that uses a grid with vertical columns representing musical notes and horizontal rows representing time intervals. Each note of a musical piece is indicated by a selected note symbol in the appropriate column, and extending across multiple rows if intended to be sounded for more than one time interval. Different note symbol shapes are used to indicate different tone qualities or playing styles.

Despite the availability of various prior art teaching methods and keyboard tablatures, there remains a need for a keyboard tablature that more effectively facilitates keyboard performance training.

BRIEF SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one broad embodiment, a piano tablature includes tab keys indicating a new measure where the tab keys display a standard piano keyboard. Middle C on a piano keyboard is highlighted. A tab measure includes note indicators for a selected song. A piano tab is read from top to bottom. The first beat of a tab measure is indicated by the bottom horizontal line of the tab header and each horizontal line of the tab measure below the bottom horizontal line represents a new beat in the measure, the placement of the note indicator can be traced vertically to a tab header to a corresponding note. White keys are represented by placing a note indicator between 2 vertical lines in the tab measure and black keys are represented by placing a note indicator directly on a vertical line.

In one aspect, the piano tablature further includes a pedal indicator that informs the player of when to press and when to release a sustain pedal, where the pedal indicator includes a vertical line to the right of a selected pedal symbol that indicates how many beats the sustain pedal is to be depressed.

In another aspect, the piano tablature includes a pedal indicator symbol shown to the left of the tab measure whereby the player is to press down the pedal with their right foot and release the pedal at the point where vertical line ends.

In yet another aspect, a piano tablature is disclosed further comprising an end of section that indicates when a particular section of a song comes to an end.

In yet another aspect, a piano tablature is disclosed further comprising at least one repeat box that indicates when a previous section is to be repeated.

In yet another aspect, a piano tablature is disclosed further comprising at least one continued section that indicates when the section is continued on the next page, and that the current section that is being played has not ended.

In yet another aspect, a piano tablature is disclosed further comprising a title block section.

In yet another aspect, a piano tablature is disclosed further comprising an "arranged by" section.

In yet another aspect, a piano tablature is disclosed further comprising a note indicator legend that defines which fingers are assigned to each indicator through visual representation.

In yet another aspect, a piano tablature is disclosed wherein the note indicator legend comprises a first selected shape for indicating that the right hand is to be used, and a second selected shape, different from the first selected shape for indicating that the left hand is to be used.

In yet another aspect, a piano tablature is disclosed wherein the note indicator legend further includes a number inside each selected shape, as, for example, a circle or square that represents which finger is to be used.

In yet another aspect, a piano tablature is disclosed wherein the note indicator legend further includes a color assigned to each circle or square, that corresponds with the color of the key that will be played.

In yet another aspect, a piano tablature is disclosed wherein a black color corresponds to black keys on a piano keyboard and white corresponds to white keys on a piano keyboard.

In yet another aspect, a piano tablature is disclosed wherein there are a total of 88 keys or some selected portion of the piano keyboard on the piano and 88 places within the tab measure to place a note indicator.

In yet another aspect, a piano tablature is disclosed wherein if more than one note indicator lines up horizontally, these notes are to be played simultaneously on a piano keyboard.

In yet another aspect, a piano tablature is disclosed wherein a melody of a song is represented by spacing the note indicators vertically so when read from top to bottom, the chronological sequence of notes can be determined.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 8 illustrates a representation of song sections as used in one example of a piano keyboard tablature.

FIG. 9 illustrates a lyric section as used in one example of a piano keyboard tablature.

FIG. 10 illustrates a repeat section as used in one example of a piano keyboard tablature.

Figure 1:
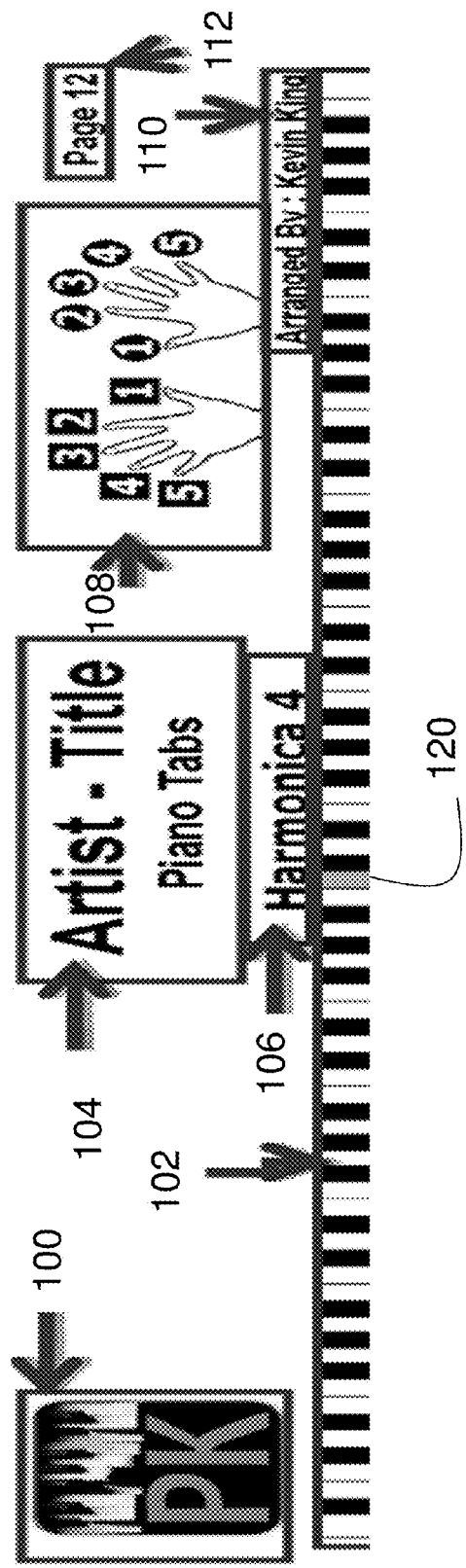
FIG. 1 shows an example of a header section of a piano keyboard tablature.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several embodiments of a piano keyboard tablature. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to a standard piano keyboard of 88 keys. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

DEFINITIONS

As used herein the following terms have the following meanings unless otherwise indicated by the context in which they appear.

"Piano Tablature" or "Piano Tab" refers to a method of conveying how a particular musical composition, as for example, a contemporary song, is played on a piano without the use of standard music notation. The purpose of the Piano Tab is to specifically inform the player of the following:

Which keys to strike on the piano,

Which finger to use to strike those keys on both the right and left hands,

The sequence of notes in a given melody,

When to play more than one note simultaneously,

When to strike the notes in relation to the beat of the song,

When to press and depress the sustain pedal, and

The relation of the song section to the lyrics of the song.

Now referring to FIG. 1, an example of a header section of a piano keyboard tablature is shown. A title block 104 lists the artist that created the work and/or the copyright holder and the title of the song or other musical composition. A section title 106 lists the title of the tab section. Tab section titles can include verses, choruses, pre-choruses, solos, and introductions, amongst other sections. This section is also used to indicate the number of times to play the sections. Sometimes a song may repeat sections a few times before another section starts. This section can also contain the word "continued" after the title to indicate that the section was continued from the previous page. As best shown in FIG. 9, song lyrics can be included in the document on a separate page and the corresponding section titles can depict the relation of the song section to the corresponding lyrics in that section.

A note indicator legend section 108 defines which fingers are assigned to each indicator through visual representation. A note indicator, as further described with respect to FIG. 4, for example, is placed closest to the finger that will be used to strike the key when the Indicator is shown within a tab measure.

In one example embodiment also included is an arranged by section 110 names the person that created the piano tab, a page number section 112 that indicates the page number of the document and a logo section 100 that provides a space for a company logo.

A tab keys section 102 indicates the start of a new measure of the musical composition. In one example eighty-eight keys of a standard piano keyboard can be displayed so as to allow the player to know which note to strike on the piano or other keyboard instrument. For orientation purposes "Middle C" 120 on a piano can be highlighted with a selected hue, shade or color as desired.

Figure 2:
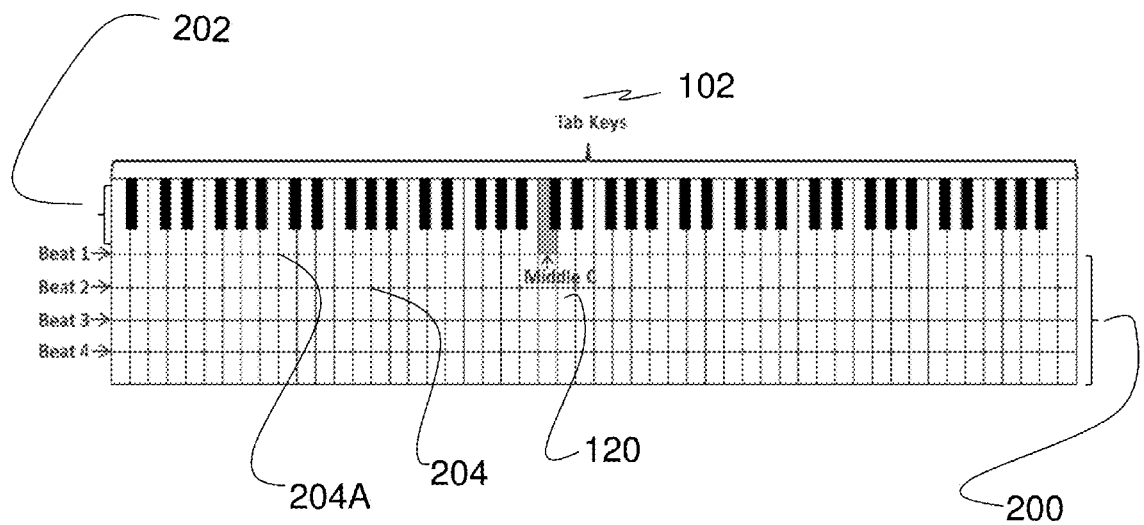
FIG. 2 illustrates tab keys as used in one example of a piano keyboard tablature.

Referring now to FIG. 2, tab keys 102 as used in one example of a piano keyboard tablature are illustrated. A measure 200 is shown comprising a group of beats, Beat 1, Beat 2, Beat 3, and Beat 4. In many popular musical compositions a measure contains 4 beats, which are often counted off as "1, 2, 3, 4" in a timed manner with a predetermined time interval between each count. A measure may have more or less beats in it, but for most contemporary songs there are 4 beats in a measure. In a piano tab, the start of a measure is indicated by a depiction of a piano keyboard 202. In one example the piano keyboard can include the 88 keys on a standard piano. Other examples may include more or less keys depending on the application. The shaded key 120 represents "Middle C" on the piano keyboard and is highlighted to allow a player to easily locate corresponding keys on an actual piano keyboard. Each beat, Beat 1, Beat 2, Beat 3, and Beat 4, is represented by a horizontal line 204 in the tab measure. The first beat in the measure is the line 204A bordering the bottom of the piano keyboard depiction 202.

Figure 3:
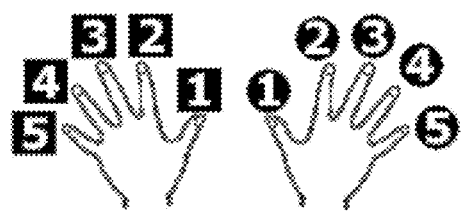
FIG. 3 illustrates fingering notation as used in one example of a piano keyboard tablature.

Referring now to FIG. 3, fingering notation as used in one example of a piano keyboard tablature is illustrated. The shape of the note indicator designates which hand to use and the numbers inside designate which fingers to use. Any convenient shapes may be used for note indicators as long as the right hand and left hand shapes are different and distinguishable. In one useful example, a square note indicator indicates the left hand L is to be used and a circle designates that the right hand R is to be used. The number inside the square or circle, as the case may be, designates which figure on the right or left hand is to be used to play the note.

As shown below, a circle indicates that the right hand is to be used, while the left hand is represented by a square. The number inside the shape represents which finger to be used. The color of the shape corresponds with the color of the key that will be played. The black shapes are black keys, the white shapes are white keys. Below is a list of each note indicator and the assigned finger to be used:

| ①,❶ Right Thumb | ⬜1,◼1 Left Thumb |
| ②,❷ Right Index Finger | ⬜2,◼2 Left Index Finger |
| ③,❸ Right Middle Finger | ⬜3,◼3 Left Middle Finger |
| ④,❹ Right Ring Finger | ⬜4,◼4 Left Ring Finger |
| ⑤,❺ Right Pinky | ⬜5,◼5 Left Pinky |

Figure 4:
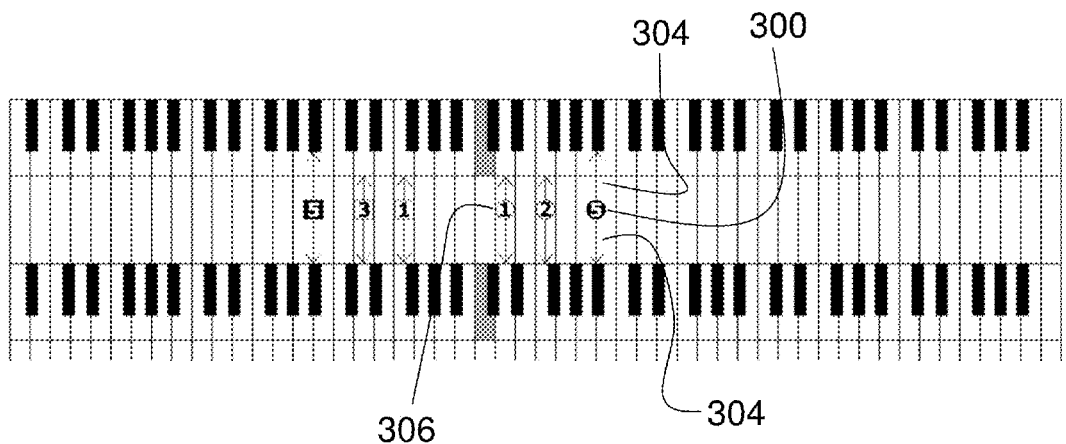
FIG. 4 illustrates note indicators as used in one example of a piano keyboard tablature.

Referring now to FIG. 4, note indicators as used in one example of a piano keyboard tablature are illustrated. As described above, note indicators 300 comprise a set of circles and squares. As the name suggests, these shapes indicate which notes to play on the piano. That is, they correspond to the key on the piano keyboard located above or below the note indicator as shown by arrows 304. A note indicator placed inside a tab measure can be traced either up or down to the tab keys to designate a single corresponding note on the piano to be played. Since the keyboard appears above and below the measure, the player may decide it is easier to see the designated note by looking at the keys below the notes.

As an example, a player playing the note designated by note indicator 306 would use the thumb on the right hand as designated by the circled "1." The note indicator traces upwards or downwards to the "D" note to the right of Middle C. Thus, the right thumb should strike the D notes. Since piano tabs are read from top to bottom and the other note indicators are all horizontally aligned, each note should be played simultaneously. That is the left hand will play B flat, lower D, and F in a lower octave, and the right hand will play D, F and B flat in the higher octave.

Figure 5:
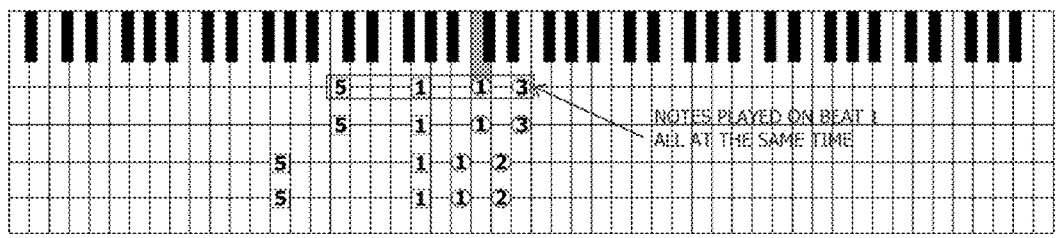
FIG. 5 illustrates a playing scheme for horizontally aligned note indicators as used in one example of a piano keyboard tablature.

Referring now to FIG. 5, a playing scheme for horizontally aligned note indicators as used in one example of a piano keyboard tablature is illustrated. Notes that are placed directly on a horizontal beat line are played on the same beat. Notes that are off the beat can be played at the same time as long as they are aligned horizontally.

Figure 6:
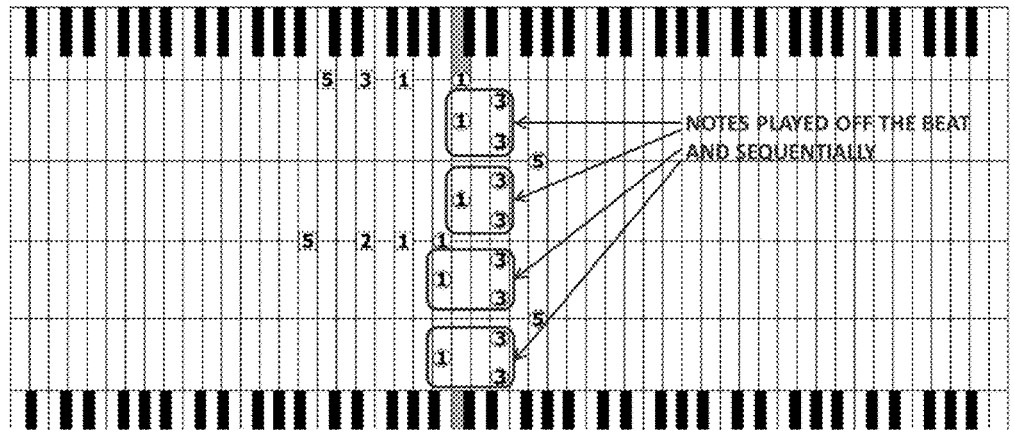
FIG. 6 illustrates another arrangement of note indicators as used in one example of a piano keyboard tablature.

Referring now to FIG. 6, another arrangement of note indicators as used in one example of a piano keyboard tablature is illustrated. Notes that are placed between two beat lines are played off the beat. The actual rhythm and duration of the notes is not indicated by the piano tabs. It is believed that this information is best learned by listening to the song itself and by having the direct experience of the rhythm and duration with the player's senses; that this information is best learned as subjectively experienced by the player. Plus, if one wants to learn a song, chances are the player has heard it before and already knows how the rhythm is supposed to be played.

Figure 7:
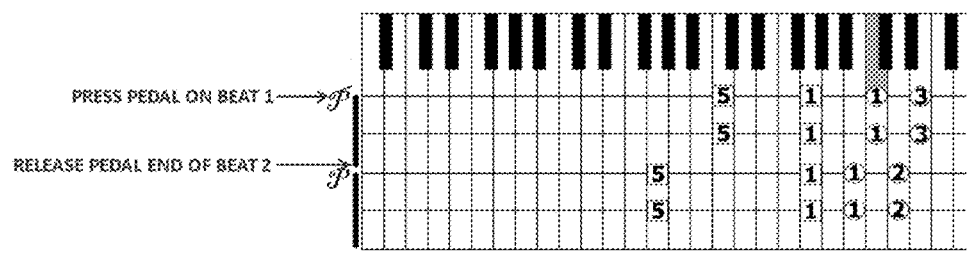
FIG. 7 illustrates pedal symbology as used in one example of a piano keyboard tablature.

Referring now to FIG. 7, pedal symbology as used in one example of a piano keyboard tablature is illustrated. The $\mathscr{P}$ symbol to the left of the measure indicates when to press down the sustain pedal (if a piano has more than one pedal, it's the rightmost pedal). The vertical line to the right of the $\mathscr{P}$ shows how long to hold down the pedal. When the line ends, the pedal should be released.

Referring now to FIG. 8, a representation of song sections as used in one example of a piano keyboard tablature is illustrated. Each song is divided into sections for easy reference as indicated by the section title 106. Each new section is given a title and an indication of how many times to play that section before moving on to the next one. In one useful example, the first page of the piano tab document can contain the lyrics to the song and can show where each section starts in reference to the lyrics.

Referring now to FIG. 9, a lyric section as used in one example of a piano keyboard tablature is illustrated. If a section is continued on the following page, it can be indicated at the bottom left of the page. When a section is complete, it can be so indicated.

Referring now to FIG. 10, a repeat section 400 as used in one example of a piano keyboard tablature is illustrated. The long rectangular boxes are called "repeat boxes". They indicate when to go back and play a previous section and how many times a designated section is repeated.

In one useful embodiment, the piano tablature can be rendered by a computer in a "portable document format" (pdf) document file measuring 8½"×11". This format offers advantages including ease of printing on 8½×11" paper. Documents in pdf format are the current standard for sharing, transmitting and viewing documents on computers of various types including personal computers, laptops, tablets, smart phones and the like. Currently, pdf viewers are readily available for free download on the internet. Such pdf files use substantially less memory than image files in other formats. It will be understood that this example is not by way of limitation and equivalent document formats may also be employed.

Employing the piano tablature systems described above, a computer processor may be employed in a method for conveying performance of a musical composition on a keyboard having black keys and white keys representing musical notes. A computer processor can be operated to generate tab keys in an electronically transmittable document format. The tab keys indicate the start of a new measure of a composition and depict a standard piano keyboard. A piano tab is read from top to bottom. Middle C on the keyboard is highlighted. Further, the computer processor can be operated to generate at least one tab measure containing a plurality of note indicators for a selected composition. The first beat of the tab measure is indicated by the bottom horizontal line of the tab header and each horizontal line of the tab measure below the bottom horizontal line represents a new beat in the measure. The placement of the note indicator traces vertically to a tab header to a designated piano key, where the white keys are represented by placing a note indicator between 2 vertical lines in the tab measure and the black keys are represented by placing a note indicator directly on a vertical line. The computer processor can also be used to generate at least one pedal indicator that informs the player of when to press and when to release a sustain pedal, where the pedal indicator includes a vertical line to the right of a selected pedal symbol that indicates how many beats the sustain pedal is to be depressed. The computer processor can further be used to generate at least one repeat box that indicates when a previous section is to be repeated. Other aspects of the piano tabs described above may be implemented using a computer processor, software, hardware or the like.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A piano tablature system for conveying performance of a musical composition on a keyboard having black keys and white keys representing musical notes, the system comprising:
    tab keys for indicating the start of a new measure of a composition where the tab keys depict a standard piano keyboard and where Middle C on the keyboard is highlighted;
    a tab measure containing a plurality of note indicators for a selected composition, where the first beat of the tab measure is indicated by the bottom horizontal line of the tab header and each horizontal line of the tab measure below the bottom horizontal line represents a new beat in the measure, the placement of the note indicator traces vertically to a tab header to a designated piano key, where the white keys are represented by placing a note indicator between 2 vertical lines in the tab measure and the black keys are represented by placing a note indicator directly on a vertical line, where a piano tab is read from top to bottom.

2. The piano tablature of claim 1 further comprising a pedal indicator that informs the player of when to press and when to release a sustain pedal, where the pedal indicator includes a vertical line to the right of a selected pedal symbol that indicates how many beats the sustain pedal is to be depressed.

3. The piano tablature of claim 2 wherein when the pedal indicator symbol is shown to the left of the tab measure, the player is to depress the pedal and release the pedal at the point where vertical line ends.

4. The piano tablature of claim 1 further comprising an end of section that indicates when a particular section of a composition ends.

5. The piano tablature of claim 1 further comprising at least one repeat box that indicates when a previous section is to be repeated.

6. The piano tablature of claim 1 further comprising at least one continued section that indicates when the section is continued on the next page, that the current section that is being played has not ended.

7. The piano tablature of claim 1 further comprising a title block section.

8. The piano tablature of claim 1 further comprising an arranged by section.

9. The piano tablature of claim 1 further comprising a note indicator legend that defines which fingers are assigned to each indicator through visual representation.

10. The piano tablature of claim 9 wherein the note indicator legend comprises a first selected shape for indicating that the right hand is to be used, and a second, different, selected shape for indicating that the left hand is to be used.

11. The piano tablature of claim 10 wherein the note indicator legend further includes a number inside each circle or square that represents which finger to be used.

12. The piano tablature of claim 10 wherein the note indicator legend further includes a color assigned to each circle or square that corresponds with the color of the key that will be played.

13. The piano tablature of claim 12 wherein a black color corresponds to black keys on a piano keyboard and white corresponds to white keys on a piano keyboard.

14. The piano tablature of claim 9 wherein there are up to 88 keys on the piano and, consequently, up to 88 places within the tab measure to place a note indicator.

15. The piano tablature of claim 9 wherein if more than one note indicator lines up horizontally, these notes are to be played simultaneously on a piano keyboard.

16. The piano tablature of claim 1 wherein a melody of a composition is represented by spacing the note indicators vertically so when read from top to bottom, the chronological sequence of notes can be determined.

17. The piano tablature of claim 1 wherein the piano tablature is rendered in a computer document file corresponding to a paper document measuring 8½"×11.

18. A piano tablature method for conveying performance of a musical composition on a keyboard having black keys and white keys representing musical notes, the method comprising:
    operating a computer processor to generate tab keys in an electronically transmittable document format, where the tab keys indicate the start of a new measure of a composition where the tab keys depict a standard piano keyboard and where Middle C on the keyboard is highlighted; and
    operating a computer processor to generate at least one tab measure containing a plurality of note indicators for a selected composition, where the first beat of the tab measure is indicated by the bottom horizontal line of the tab header and each horizontal line of the tab measure below the bottom horizontal line represents a new beat in the measure, the placement of the note indicator traces vertically to a tab header to a designated piano key, where the white keys are represented by placing a note indicator between 2 vertical lines in the tab measure and the black keys are represented by placing a note indicator directly on a vertical line, where a piano tab is read from top to bottom.

19. The piano tablature method of claim 18 further comprising operating a computer processor to generate at least one pedal indicator that informs the player of when to press and when to release a sustain pedal, where the pedal indicator includes a vertical line to the right of a selected pedal symbol that indicates how many beats the sustain pedal is to be depressed.

20. The piano tablature method of claim 18 further comprising operating a computer processor to generate at least one repeat box that indicates when a previous section is to be repeated.

* * * * *